Patented Dec. 26, 1933

1,940,842

UNITED STATES PATENT OFFICE 1,940,842

PROCESS FOR THE CRYSTALLIZATION OF ALUMINUM NITRATE OBTAINED IN THE TREATMENT OF LEUCITE AND SIMILAR SILICATES

Alberto Carlo Blanc, Rome, Italy

No Drawing. Application December 17, 1930, Serial No. 503,102, and in Italy December 24, 1929

2 Claims. (Cl. 23—102)

The solution obtained from the treatment of leucite and similar silicates with nitric acid, contains, in addition to a mixture of nitrates of aluminium, of potassium and nitrates of other metals in small quantities, a certain amount of free nitric acid and water, which latter serves to form to a great extent the water of crystallization of aluminium nitrate when this salt is separated by further acidifying the solution.

Under ordinary working conditions, in order to obtain high efficiency in the attack of the mineral, it is necessary to use nitric acid having a concentration which should not be above 50% by weight (35° Bé.) Consequently when hereinafter reference is made to "normal attack" it means the liquid which is obtained from the attack of one kilo of the mineral with 1800 c.c. of 50% $HNO_3$ by weight.

It is precisely this resulting solution which has to be acidified further in order to obtain the separation of aluminium nitrate. It is however not found convenient in practice to acidify directly the liquid of normal attack obtained, for the reason that the water present in the solution acts as a solvent of the aluminium nitrate, and during the stage of subsequent acidification, it decreases the concentration of the $NO_3$ ions, from which concentration depends the crystallization of aluminium nitrate.

If therefore, prior to the further addition of acid to the solution, the latter is concentrated, it is possible to eliminate therefrom all the free water in excess, viz; the water which is not required for the crystallization, and in addition, also about 5 of the 15 molecules of water which are generally required for the said crystallization of aluminium nitrate, so that the nitrate which is made to crystallize, under these conditions does not contain more than about 10 molecules of crystallization water.

The volume of the solution may thus be reduced down to about 50% of the volume of the original solution, and the advantage is obtained that the quantity of concentrated nitric acid required to be added in order to reach the concentration of $NO_3$ ions necessary for the practically total crystallization of aluminium nitrate, is reduced nearly in the same proportion.

The experiments that have been made for the purpose of ascertaining the quantity of 98% acid which is required to be added to the liquid of normal attack, in order to obtain the same results in aluminium nitrate obtained by the acidification of the liquid of attack which has been previously concentrated to 50% of its original volume, have furnished the results hereinafter reported.

In order to obtain a given yield of aluminium nitrate from a normal attack solution (not concentrated), one must add to said solution 98% nitric acid up to an amount of from 2 to 2½ times the volume of said solution, while, when in accordance with the present invention, the normal attack solution is at first concentrated down to 50% of its volume, the same yield of aluminium nitrate is obtained by the addition to said concentrated solution, of 98% nitric acid in an amount corresponding to the same volume of the concentrated solution. Therefore, the amount of strong nitric acid required in my process is reduced to from ¼ to ⅕ of the amount of acid required when the normal attack solution is not previously concentrated, thus resulting in a considerable saving.

Moreover, my new process possesses the additional advantage of obtaining an increased acidity of the mother liquors which allows of a greater facility in the recovery of nitric acid from them.

In fact, if the operation is carried out without previous concentration of the solution, the ratio $$\frac{HNO_3}{H_2O}$$

which is obtained in the mother liquors is about 60%, while if the solution is previously concentrated, this ratio is greater than 80% of acidity when a concentration of 30% is reached, and 90% of acidity, when the concentration is brought up to 50%.

These very high degrees of acidity of the mother liquors, allow of the rectification of the nitric acid contained in them during their evaporation, advantage being taken of the difference of the boiling points of the acid when concentrated to above 67%. In fact by the nitric acid vapors evolved during the concentration of the normal attack solution being conveyed to a condensing tower operated at atmospheric pressure, one portion of the said tower is maintained at a temperature of about 125° C., at which temperature the nitric acid having a strength of 70% is condensed, while the other portion of the tower is maintained at a temperature of about 86° C., at which the strong nitric acid having a concentration of 98% is condensed. The heating of the tower is effected by the calories contained in the nitric acid vapors entering the tower. It is thus possible to recover all the acid, partly concentrated to 70%, which can be used for the normal attack and the remainder concentrated to 98%, which allows of its direct utilization for acidifying a fresh solution of mixed nitrates for the purpose of obtaining crystallized aluminium nitrate.

The important economical advantage of the process above described in comparison with the method now used, will readily be understood, when it is considered that if the solution resulting from the attack is not concentrated before the addition of the acid to it, the total amount of acid concentrated to 98% required for the acidification would have to be obtained from diluted solutions, sulphuric acid being used, which latter has to be in its turn re-concentrated in order to absorb the water. All these operations would necessitate the use of large volumes of acids, would entail process losses and require a very considerable amount of fuel.

Another practical advantage of great importance consists in the fact that the aluminium nitrate obtained in the above described manner, containing a very small amount of crystallization water, much lower than the usual aluminium nitrate, can be decomposed by heat, or otherwise treated at high temperature, without melting in its crystallization water, which contributes to diminishing the wear of the reaction recipients, thus preserved from the action of the acid in the liquid state.

I claim:

1. The method of reducing the quantity of concentrated nitric acid required for separating aluminum nitrate from the solution resulting from the attack of leucite with nitric acid, which consists in concentrating the acid solution of nitrates, from which the aluminum nitrate is to be separated, by evaporating it down to about 50% of its original volume, to thereby eliminate all the water contained in the solution as well as a portion of the water normally required for the crystallization of aluminum nitrate, and then adding to the concentrated solution the amount of concentrated nitric acid required for obtaining the separation and crystallization of aluminum nitrate, said amount being less than half the amount of concentrated nitric acid required to be added to a previously not concentrated solution.

2. The method as specified in claim 1, in which the nitric acid evolved during the concentration of the acid solution of nitrates is recuperated, which method consists in conducting the products of distillation consisting of nitric vapors to a condensing tower operated at atmospheric pressure, one portion of said tower being maintained at a temperature of about 125° C. at which temperature nitric acid having a strength of 70% is condensed, while the other portion of the tower is maintained at a temperature of about 86° C. in which the strong nitric acid having a concentration of 98% is condensed, the heating of the tower being effected by the calories contained in the nitric acid vapors entering the tower, the two different strengths of acid being used in the respective two stages of the method specified in claim 1.

ALBERTO CARLO BLANC.